(12) United States Patent
Schucker

(10) Patent No.: US 12,043,536 B2
(45) Date of Patent: Jul. 23, 2024

(54) COOLING OF A BEVERAGE DISPENSER

(71) Applicant: RIPRUP Company S.A., St. Peter Port (GG)

(72) Inventor: Josef Schucker, Ronco Sopra Ascona (CH)

(73) Assignee: RIPRUP Company S.A., St. Peter Port (GG)

( * ) Notice: Subject to any disclaimer, the term of this patent is extended or adjusted under 35 U.S.C. 154(b) by 182 days.

(21) Appl. No.: 17/870,624

(22) Filed: Jul. 21, 2022

(65) Prior Publication Data

US 2023/0029082 A1    Jan. 26, 2023

(30) Foreign Application Priority Data

Jul. 23, 2021  (EP) .................................... 21187500

(51) Int. Cl.
*B67D 1/08* (2006.01)
*B01D 61/02* (2006.01)
(Continued)

(52) U.S. Cl.
CPC .......... *B67D 1/0859* (2013.01); *B01D 61/025* (2013.01); *B01D 61/081* (2022.08);
(Continued)

(58) Field of Classification Search
CPC .......... F25B 41/20; F25B 41/30; F25B 41/39; F25B 13/00; F25B 30/02; F25B 49/022;
(Continued)

(56) References Cited

U.S. PATENT DOCUMENTS 7,264,731 B2    9/2007  Bosko
2020/0361758 A1   11/2020  Fantappie et al.

FOREIGN PATENT DOCUMENTS

CN    101960240 A  *  1/2011  ........... B01D 61/025
DE   102013113641 A1    6/2015
(Continued)

OTHER PUBLICATIONS

European Patent Office: "European Search Report"; Jan. 12, 2022; Search report in related EP application Serial No. EP 21187500.

*Primary Examiner* — Emmanuel E Duke
(74) *Attorney, Agent, or Firm* — Bryan W. Bockhop; Bockhop Intellectual Property Law, LLC

(57) ABSTRACT

A beverage dispenser has a supply opening that supplies an aqueous liquid from a source; a recooling heat exchanger having a heat receiving portion, a recooling inlet and a recooling outlet; a reverse osmosis filter having an inlet for aqueous liquid, a permeate outlet and a concentrate outlet; and a cooling device having a cooling portion extracting heat energy from the permeate and a heat dissipation portion dissipating energy to the heat receiving portion of the recooling heat exchanger. The heat dissipation portion of the cooling device is thermally coupled with the heat receiving portion of the recooling heat exchanger. The cooling portion of the cooling device is thermally coupled with the permeate exiting the permeate outlet of the reverse osmosis filter, wherein the permeate enters the cooling portion by a cooling portion permeate inlet and exits the cooling portion by a cooling portion permeate outlet.

15 Claims, 1 Drawing Sheet

(51) Int. Cl.
*B01D 61/08* (2006.01)
*C02F 1/00* (2023.01)
*C02F 1/44* (2023.01)
*C02F 1/68* (2023.01)

(52) U.S. Cl.
CPC .............. *C02F 1/008* (2013.01); *C02F 1/441* (2013.01); *C02F 1/68* (2013.01); *B01D 2311/06* (2013.01); *B01D 2311/106* (2013.01); *B01D 2311/14* (2013.01); *B01D 2311/16* (2013.01); *B01D 2311/2661* (2013.01); *B01D 2311/2673* (2013.01); *B01D 2311/2674* (2022.08); *B01D 2313/18* (2013.01); *B01D 2313/221* (2022.08); *B01D 2313/243* (2013.01); *B67D 2210/0001* (2013.01); *B67D 2210/00104* (2013.01); *C02F 2201/005* (2013.01); *C02F 2209/03* (2013.01); *C02F 2209/40* (2013.01)

(58) Field of Classification Search
CPC ........ F25B 2500/222; F25B 2600/0253; F25B 2700/21; F25B 2700/1931; F25B 2700/1933; F25B 2700/21151; F25B 2400/13; F25B 2400/19
See application file for complete search history.

(56) References Cited

FOREIGN PATENT DOCUMENTS

| | | | | |
|---|---|---|---|---|
| EP | 2316796 | A2 | 5/2011 | |
| EP | 3489597 | A1 * | 5/2019 | .............. F25B 21/04 |
| KR | 20130009327 | A * | 1/2013 | .............. C02F 1/001 |
| WO | 03037492 | A1 | 5/2003 | |

\* cited by examiner

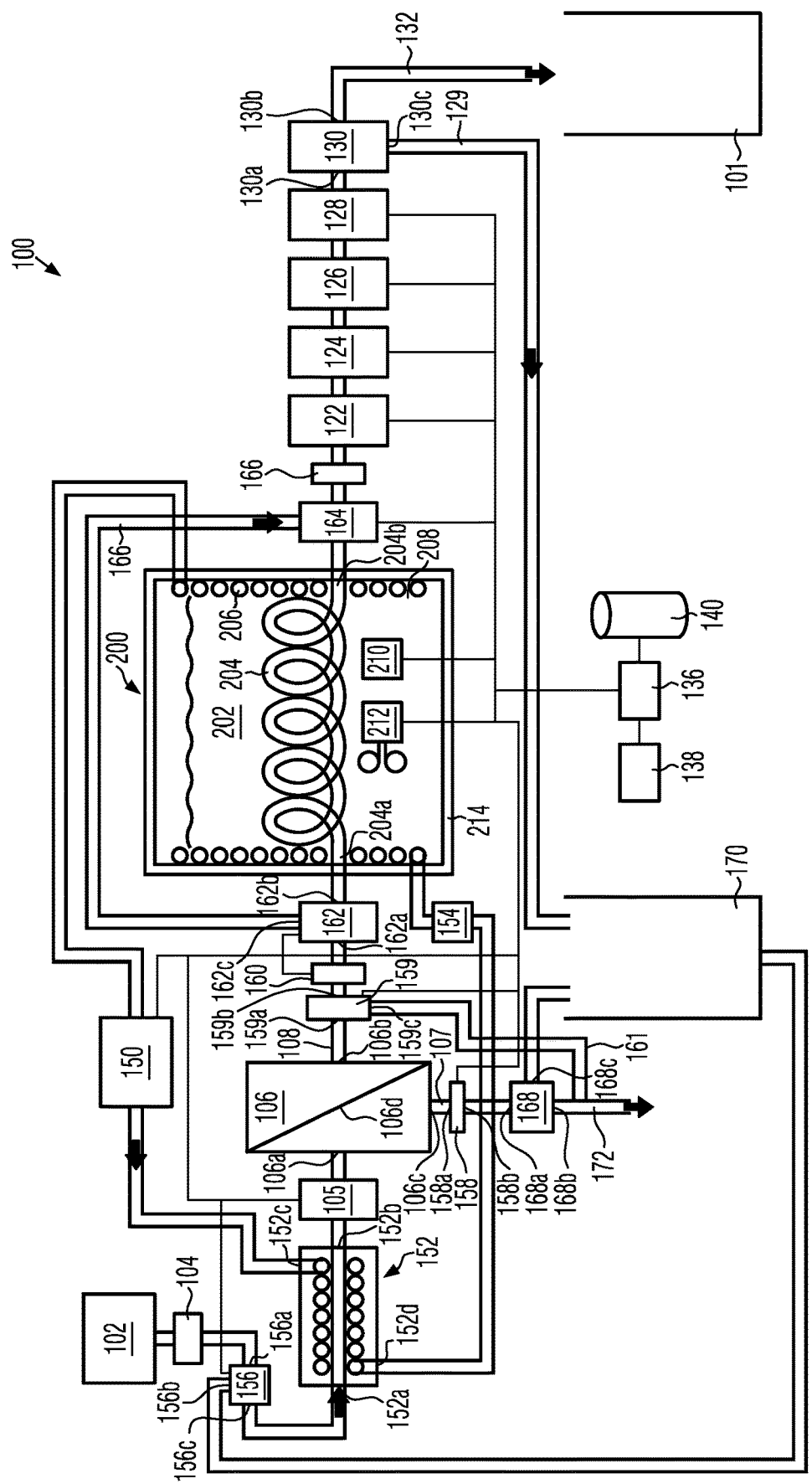

COOLING OF A BEVERAGE DISPENSER

CROSS-REFERENCE TO RELATED APPLICATION(S)

This application claims the benefit of EP Patent Application No. EP21187500.0, filed Jul. 23, 2021, the entirety of which is hereby incorporated herein by reference.

BACKGROUND OF THE INVENTION

1. Field of the Invention

The present invention relates to a beverage dispenser having a tempering device for cooling beverage.

2. Description of the Related Art

Beverage dispensers are generally known to the person skilling the art. Most beverage dispensers offer the possibility to cool beverage. The beverage is generally cooled by evaporating the coolant and that has been compress by a compressor and the cooled by a condenser. The heat of the condenser is generally removed from the condenser by a forced convection of air. The forced convection may be achieved by a fan emitting undesired noise. Since air has a low mass and a low heat capacity large cooling fins must be arranged at the evaporator, wherein the forced convection of air has to be passed over the cooling fins. The heat transmission by the cooling fins is deteriorated during operation by a dust, dirt and the like that is deposited on the fins. A filter arranged at the air inlet portion may reduce dust and dirt in the cooling area. However, such filters generally suffer from clogging by dust and dirt. In many other environments it is undesired that the beverage dispenser emits heat into a room, such as an office, a kitchen or the like.

If a beverage dispenser needs to be integrated into an existing kitchen furniture, additional inlet and outlet openings must be foreseen in the existing furniture for air to be passed to the condensator and from the condensator. Generally is undesired by a user to cut large openings for cooling air into an existing kitchen furniture.

SUMMARY OF THE INVENTION

It is an object of the present invention to provide a beverage dispenser that does not require a forced air convection for cooling.

The object of the present invention is achieved by a beverage dispenser according to claim 1 or a method according to claim 15. Preferred embodiments are claimed by the depending claims.

The invention discloses a beverage dispenser having a supply opening, a recooling heat exchanger, a reverse osmosis filter and a cooling device. The supply opening is adapted for supplying an aqueous liquid from a source of aqueous liquid. The supply opening may be coupled to the source of aqueous liquid. The recooling heat exchanger as a heat receiving portion, a recooling inlet and a recooling outlet. The supply opening is coupled with the recooling inlet. The reverse osmosis filter comprises an inlet for aqueous liquid, a permeate outlet and a concentrate outlet. The recooling outlet of the recooling heat exchanger is connected to the inlet of the reverse osmosis filter. Reverse osmosis filters are known to the person skilled in the art and do not have to described in detail herein. Generally, pressurized liquid is passed to a membrane of the reverse osmosis filter. Filtered liquid is passed through the membrane and exits the reverse osmosis filter through the permeate outlet. The remaining liquid is drained through the concentrate outlet.

The cooling device has a cooling portion extracting heat energy from the permeate and a heating portion dissipating energy to the heat receiving portion of the recooling heat exchanger. The heating portion of the cooling device is thermally coupled with the heat receiving portion of the recooling heat exchanger. The cooling portion of the cooling device is thermally coupled with the permeate exiting the permeate outlet of the reverse osmosis filter. Permeate enters the cooling portion by a cooling portion permeate inlet and exits the cooling portion by a cooling portion permeate outlet.

By cooling the permeate by the cooling portion of the cooling device heat is generated that is dissipated by the heat dissipation portion of the cooling device. The heat is passed to the heat receiving portion of the recooling heat exchanger. The recooling heat exchanger passes the heat to the aqueous liquid flowing to the inlet of the reverse osmosis filter.

First of all, the present invention has the advantage that no forced convection of air is necessary for dissipating heat of a cooling device. Thereby, noise of the beverage dispenser is reduced significantly (from an unsatisfying high level to inaudible), installation of the beverage dispenser is facilitated, maintenance efforts of the beverage dispenser can be reduced, no hot air is directed into a room etc.

The second advantage of the present invention is, that the temperature of the aqueous liquid, such as tap water, is increased in the recooling heat exchanger. Tap water may have a temperature between 7° C. and 15° C. depending on the location and the season. If the temperature of the aqueous liquid entering the inlet of the reverse osmosis filter is increased, the efficiency of the reverse osmosis membrane is increased and the membrane may be operated with a lower pressure or the reverse osmosis filter outputs more permeate if a constant pressure is applied.

The beverage dispenser may further comprise at least one beverage preparation component arranged downstream of the cooling portion and upstream of a nozzle for outputting beverage. The beverage preparation element may comprise a carbonization device for carbonizing beverage and/or a demineralization device for mineralizing beverage. In one embodiment the carbonization device may be a flow-type carbonization device for individually carbonizing beverage on demand. In one embodiment the mineralization device may be a flow-type mineralization device for individually mineralizing beverage on demand.

In one embodiment, the cooling device may be a thermoelectric cooling device, such as a Peltier element.

In another embodiment, the permeate may be cooled by a cooling circuit according to the Joule Thompson effect. The heat receiving portion of the recooling heat exchanger may comprise a condensing portion having a condensing portion inlet and a condensing portion outlet. The condensing portion is adapted to condense a cooling fluid entering the condensing portion inlet in a gaseous state and to exit the condensing portion outlet in a liquid state. The cooling device may comprise an evaporation portion having an evaporation portion inlet and an evaporation portion outlet. The cooling fluid enters the evaporation portion inlet in a liquid state and exits the evaporation portion outlet in a gaseous state. The evaporation portion outlet is fluidly coupled with the condensing portion inlet. The condensing portion outlet is fluidly coupled with the evaporation portion inlet. In other words, the permeate is cooled by the evaporator, in which the cooling fluid is evaporated. The heat dissipated by the condenser, in which the cooling fluid condenses is transferred to the aqueous liquid flowing to the inlet of the reverse osmosis filter. Since the aqueous liquid drawn from the source of aqueous liquid has a temperature within a comparably low range and since water has a high heat capacity it is possible to select a stable operation point with a high coefficient of performance (COP) of the cooling device. Thereby, it is possible to reduce heat dissipation of the condenser.

The coefficient of performance is defined as follows:

COP=heat drawn from the permeate/electrical power of compressor; [$W/W$]

The coefficient of performance may be larger than 1 since it does not identify the classical decree of efficiency. The coefficient of performance may range in a cooling system with well selected operation points between 1.5 and 5. Such coefficient of performance is generally indicated by the ASHARE standard. The water cooled cooling system of the present invention may achieve a higher coefficient of performance as an air cooled cooling systems, since the operation point are more stable.

The beverage dispenser may comprise a pump arranged upstream of the inlet of the reverse osmosis filter. The pump may be arranged downstream of the recooling heat exchanger and upstream of the inlet of the reverse osmosis filter.

The beverage dispenser may comprise a compressor coupled between the evaporator portion outlet and the condensator portion inlet. The compressor is adapted to compress the gaseous liquid. The compressor may be a piston compressor or a screw compressor.

In one embodiment the beverage dispenser may comprise a cooling bath. The cooling bath comprises a tank, in which an aqueous buffer liquid is stored. The aqueous buffer liquid is thermally coupled with the cooling portion of the cooling device. The cooling bath comprises a cooling conduit that is surrounded by aqueous buffer liquid. The permeate may flow within the cooling conduit. The cooling bath may be thermally isolated from the surrounding environment. Such cooling bath are known as ice-box. The temperature of the aqueous buffer liquid may range between 0.5° C. to 4° C. The aqueous buffer liquid stores cooling energy. If a higher amount of beverage has to be cooled, the temperature of the aqueous buffer liquid increases. The temperature of the aqueous buffer liquid is decreased by the cooling device.

The cooling bath may comprise at least one circulation element for providing a forced circulation of the aqueous buffer liquid in the tank. Thereby, a uniform temperature distribution in the cooling bath may be achieved.

The beverage dispenser may comprise a drain tank having a first drain tank inlet and a drain tank outlet. The beverage dispenser may further comprise an inlet valve having a first inlet, a second inlet and an outlet. The drain tank inlet is coupled with the concentrate outlet. The drain tank outlet is coupled with the second inlet of the inlet valve. The first inlet of the inlet valve is coupled with the supply opening. The outlet of the inlet valve is coupled with the recooling inlet.

In this embodiment, the concentrate is stored in the drain tank. The concentrate may be used for recooling the recooling heat exchanger during a time span, in which no beverage has to the dispensed, for example to keep the temperature of the aqueous buffer liquid in the desired range. The liquid stored in the drain tank may also be used for cooling the aqueous buffer liquid after activating (switching on) the beverage dispenser after a longer period, during which the beverage dispenser was deactivated or switched off. Thereby, the efficiency of water use is increased.

The beverage dispenser may further comprise an output valve having an inlet, a first outlet and a second outlet. The inlet of the output valve is in fluid communication with the permeate outlet. The first outlet of the output valve is in fluid communication with a nozzle outputting beverage into a user vessel. The second outlet of the output valve is in fluid communication with the drain tank inlet. During normal operation beverage flows from the inlet of the output valve to the nozzle. The beverage preparation element may be arranged between the permeate outlet and the inlet of the output valve. If a component between the permeate outlet and the inlet of the output valve needs to be flushed, permeate flows from the permeate outlet to the inlet of the output valve and thereafter via the second outlet into the drain tank inlet.

Thereby, the flushing liquid is also stored for later use for recooling the recooling heat exchanger. Thereby efficiency of use of the aqueous liquid is further increased.

The beverage dispenser may further comprise a drain valve having an inlet, a first outlet and a second outlet. The inlet of the drain valve is coupled with the concentrate outlet of the reverse osmosis filter. The first outlet of the drain valve is coupled with the second inlet of the inlet valve. The second outlet of the drain valve is in fluid communication with the drain tank such that liquid may flow from the second outlet of the drain valve into the drain tank. In this embodiment, for increasing the efficiency of use of the aqueous liquid the concentrate is recycled into the drain tank after cooling the recooling heat exchanger.

The beverage dispenser may comprise a controller connected with the pump and compressor. In a first operation mode the controller controls the inlet valve such that aqueous liquid may flow from the source of aqueous liquid via the first outlet of the inlet valve to the recooling inlet. In the first operation mode the controller controls the pump to operate with a first pressure such that aqueous liquid passes through the membrane of the reverse osmosis filter to the permeate outlet. In this operation mode the controller controls the compressor to pass cooling fluid to the condensing portion of the recooling heat exchanger. The first operation mode is a normal operation mode, in which permeate is cooled and heat dissipated from the recooling heat exchanger is passed to the aqueous liquid from the source of aqueous liquid that enters the inlet of the reverse osmosis filter.

In a second operation mode the controller controls the inlet valve such that aqueous liquid may flow from the source of aqueous liquid via the first outlet of the inlet valve to the recooling inlet. In the second operation mode the controller controls the pump to operate with a second pressure such that the aqueous liquid does not pass through the membrane of the reverse osmosis filter to the permeate outlet, but exits the reverse osmosis filter through the concentrate outlet. In this operation mode the controller controls the compressor to pass cooling fluid to the condensing portion inlet of the recooling heat exchanger. The second pressure is lower than the first pressure. In this operation mode no beverage is dispensed. The aqueous liquid drawn from the source of aqueous liquid, such as tap water, is used for recooling the recooling heat exchanger and discarded. This operation mode may be suitable for cooling the aqueous buffer liquid of the cooling bath to the desired temperature range after a longer period, in which the beverage dispenser was not active or switched off. The second operation mode is terminated, if the temperature of the aqueous buffer liquid of the cooling by ranges within the desired set temperature range, or if a user requests beverage to be dispensed.

In a third operation mode the controller controls the inlet valve such that liquid may flow from the outlet of the drain tank via the second outlet of the inlet valve to the recooling inlet. The controller controls the pump to operate with a second pressure such that concentrate passes not through the membrane of the reverse osmosis filter to the permeate outlet but exits the reverse osmosis filter through the concentrate outlet. The controller controls the compressor to pass cooling fluid to the condensing portion inlet of the recooling heat exchanger. The second pressure is lower than the first pressure. In the third operation mode the concentrate and/or flush liquid is used for recooling the recooling heat exchanger.

The beverage dispenser may comprise a tempering valve having an inlet coupled with the permeate outlet of the reverse osmosis filter, a first outlet coupled with the cooling portion permeate inlet and a second outlet coupled with the heating device. In a fourth operation mode the controller controls the tempering valve such that permeate can flow via the second outlet of the tempering valve to the heating device. The controller may control the pump to operate with a first pressure such that aqueous liquid passes through the membrane of the permeate outlet. The controller controls the compressor to pass cooling fluid to the condensing portion inlet of the recooling heat exchanger. In this operation mode the permeate is heated by the heating device, for example for brewing coffee or tea. The permeate does not pass through the cooling device. Nevertheless, the aqueous liquid passing from the source of aqueous liquid is used for recooling the recooling heat exchanger and for cooling a cooling liquid reservoir that may cooling permeate later. The cooling device may operate in the fourth operation mode as a heat pump for increasing the temperature of the aqueous liquid flowing to the inlet of the reverse osmosis filter.

In the first operation mode, the second operation mode and the third operation mode the controller controls the tempering valve such that permeate can flow via the first outlet of the tempering valve to the cooling portion permeate inlet.

The invention also disclosed a method of preparing beverage, comprising the step of drawing an aqueous liquid from a source of aqueous liquid and passing the aqueous liquid to a recooling inlet of a recooling heat exchanger having a heat receiving portion thermally coupled with the aqueous liquid passing through the recooling heat exchanger, wherein heat is transferred from the heat receiving portion to the aqueous liquid passing through the recooling heat exchanger. The method passes the aqueous liquid from an outlet of the recooling heat exchanger to the inlet of a reverse osmosis filter. Then the method passes permeate from a permeate outlet of the reverse osmosis filter to a cooling device having a cooling portion extracting heat energy from the permeate and a heat dissipation portion dissipating energy to the heat receiving portion of the recooling heat exchanger. The cooling portion of the cooling device is thermally coupled with the permeate exiting the permeate outlet of the reverse osmosis filter. The heat dissipation portion of the cooling device is thermally coupled with the heat receiving portion of the recooling heat exchanger.

The method may be further embodied as described above in context of the beverage dispenser.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

BRIEF DESCRIPTION OF THE FIGURES OF THE DRAWINGS

The present invention is now explained in further detail by explanatory and non-limiting embodiments with reference to the enclosed drawings, wherein:

FIG. 1 is a schematic diagram of an embodiment of a beverage dispenser according to the present invention.

DETAILED DESCRIPTION OF THE INVENTION

The invention is now explained in further detail with reference to the attached drawings. None of the drawings is drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on." Spatial relationships like "above", "blow" or the like are not to be interpreted limiting.

Reference is made to FIG. 1 showing a beverage dispenser 100 according to the present invention. The water dispenser 100 is connected to a water source 102 that may be tap water or a tank.

The water source 102 is connected by a conduit with a pre-filter 104 which may comprise a sediment filter and/or an activated carbon filter.

The pre-filter 104 is connected to a reverse osmosis filter 106 acting as demineralization device. The water drawn from the water source 102 is pressurized by a pump 105 before entering the reverse osmosis filter. Operation of a reverse osmosis filter 106 is known to the person skilled in the art, and therefore operation of the reverse osmosis filter 106 does not have to be explained in further detail. Generally, pressurized liquid is passed to a membrane of the reverse osmosis filter. Filtered liquid is passed through the membrane and exits the reverse osmosis filter through the permeate outlet into a permeate conduit 108. The concentrate, in which the undesired components, such as minerals, heavy metals or the like are solved, as well as filtered microorganisms are output to a concentrate conduit 107. Generally, pressurized liquid is passed to a membrane of the reverse osmosis filter. Filtered liquid is passed through the membrane and exits the reverse osmosis filter through the permeate outlet into a permeate conduit 108.

The water (permeate) output by the reverse osmosis filter 106 passes a cooling bath 200 such as an ice box. Thereafter the water flows to the input of a flow-type carbonization device 122 adding carbon dioxide to the water as set by a dispenser controller 136. The water passes from the outlet of the flow type carbonization device 122 to a flow-type tempering device 124 that may be embodied by electric heater. The set temperature of the water to be output by the flow-type tempering device 124 is commanded by a dispenser controller 136.

From an output of the flow-type tempering device 124 forming also a beverage preparation device, the water flows to a flow-type mineralization device 126 also forming a beverage preparation device. The dispenser controller 136 controls the mineralization device 126 such that the water output by the flow-type mineralization device comprises the minerals desired by a user.

The flow-type mineralization device 126 may comprise a plurality of vessels filled with mineralization fluid, wherein a plurality of micro metering pumps delivers the mineralization fluids in the respective desired quantity into the water flowing through an input of the flow-type mineralization device 126 to an output of the flow-type mineralization device 126. Such flow-type mineralization device is for example disclosed in the European patent application EP18207971.5, which is incorporated herein in its entirety by reference. The water flows from the output of the flow-type mineralization device 126 through a retrograde contamination prevention device 128, such as a UV light source to an output valve 130, before it is output by a nozzle to a portable beverage vessel 101. The portable beverage vessel 101 may be a glass, a cup, a bottle, a carafe or the like. The portable beverage vessel 101 may be suitable for carrying beverage for a single person or a small group of persons, such as 1 to approximately 10 persons. "Portable beverage vessel" in the context of the present invention means that the beverage vessel may be carried by a person, such as a waiter, nurse or a user.

All components of conduits, the flow-type carbonization device 122, the flow-type tempering device 124, the flow-type mineralization device 126, the retrograde contamination prevention device 128, the output valve 130 and the nozzle 132 are made of metal and/or glass that is biological inert. Also, the output port for permeate of the reverse osmosis filter 106 is made of biological inert material, particularly a biological inert metal. The biological inert metal may comprise stainless steel, VA steel, VA1 steel, VA2 steel, VA3 steel, VA4 steel or the like. A biological inert material is a material that does not serve as nutrition for germs, microorganisms, a biological film, bacteria, virus or the like. Germs cannot form on biological inert metal contrary to plastics. Thereby, germ formation and deposition of biological films are prevented.

In the beverage dispensing operation mode, the controller controls the pump 105 after a request of a user to dispense beverage such that in all beverage preparation devices 122, 124, 126 an equal flow rate is achieved.

The beverage dispenser 100 according to the present invention further comprises a user interface 138 such as a touch sensitive screen, by which the user may select the type of beverage and/or parameters of the beverage to be dispensed. The parameters of the beverage to be dispensed may comprise the temperature of the beverage, the carbonization of the beverage, the mineralization of the beverage, any type of flavoring agents or the like. The parameters may be individually selectable by a user or may be determined by predefined recipes or types of beverage displayed on a display. The recipe may be a reference to list defining type and quantity of ingredients or a list defining type and quantity of ingredients. The parameter may include an identification of a user who requests the beverage.

The recipes may be stored in a database 140 of the beverage dispenser 100. The user may select the appropriate recipe by the user interface 138. The recipe defines the type of beverage and parameters of beverage to be output.

The cooling technique according to the present invention is now explained in further detail with reference to a Joule Thompson cooling circuit. It is to be understood that different cooling techniques may be applied in the context of the present invention, such as thermoelectric cooling by Peltier elements.

The permeate exiting the permeate outlet 106b from the reverse osmosis filter 106 passes through a coil shaped conduit 204 in a cooling bath 200, such as an ice box. The cooling bath 200 may comprise a tank 208 filled with an aqueous buffer liquid 202. The aqueous buffer liquid 202 may be essentially demineralized water with anti-scaling agents and antifouling agents. The set temperature range of the aqueous buffer liquid 202 may range between 0.5° C. and 4° C. The actual temperature of the aqueous buffer liquid 202 is monitored by a buffer temperature sensor 210. The controller 136 reads the actual temperature of the aqueous buffer liquid 202 from the buffer temperature sensor 210. The controller 136 also controls a circulation pump 212 arranged with in the tank 208 of the cooling bath 200. The circulation pump 212 circulates the aqueous buffer liquid 202 for achieving a preferably uniform temperature distribution of the aqueous buffer liquid 202 within the tank 208 by a forced circulation.

The cooling bath 200 further comprises an insulating layer around the tank 208. The tank 208 may be made of metal, such as stainless steel, or of plastic. The insulating layer 214 may be made of any suitable material, such as plastics, foamed plastics, styrofoam or the like. The tank 208 may have a volume of approximately 8 l to approximately 12 l. The insulating layer may have a thickness of at least 1.5 cm. The coil shape conduit 204, in which the permeate flows from the permeate inlet 204a to the permeate outlet 204b can be made of stainless steel, VA steel, VA1 steel, VA2 steel, VA3 steel, VA4 steel or the like.

The aqueous buffer liquid 202 in the tank 208 is cooled by an evaporator coil 206 arranged around the tank 208 and thermally coupled with the tank 208. The evaporator coil 206 forms a plurality of windings within the lateral walls of the tank that extend in the use in the vertical direction.

Now, the Joule Thompson cooling circuit is explained in context of the present invention. The cooling circuit comprises a compressor 150 that is electrically powered and controlled by the controller 136. The compressor 150 comprises a cooling fluid such as propane 8290. The compressed cooling fluid is passed to a condenser 152 acting as recooling heat exchanger. The compressed cooling fluid enters a condensing portion inlet 152c in a gaseous state and exits the condensing portion outlet 150 to the delay a liquid state. The condensing heat is dissipated to the aqueous liquid flowing from a recooling inlet 152a of the condenser to a recooling outlet 152b of the condenser 152. Thereby, the temperature of the aqueous liquid is increased.

The source of aqueous liquid 102 is generally tap water. The temperature of the tap water may depend on the geographic location, building properties and the season between 5° C. and 15° C. The temperature of the aqueous liquid is increased by heat dissipated by the condenser 152. The membrane 106 the of the reverse osmosis filter 106 has to be pressurized by the aqueous liquid by a higher pressure, if the temperature of the aqueous liquid decreases. If the temperature of the aqueous liquid increases, a lower pressure is required for efficiently filtering the aqueous liquid by the membrane 106 the. Therefore, the beverage dispenser 100 may be operated more efficiently, if the temperature of the aqueous liquid is increased by the heat dissipated in the condenser 152.

The temperature of the aqueous liquid is not increase above approximately 35° C. for avoiding scaling.

The liquid cooling fluid flows from the condensing portion outlet 152b to the of the condenser 152 to a thermal expansion valve 154, where cooling fluid is expanded. From the thermal expansion valve 154 the gaseous cooling fluid flows into the evaporator coil 208.

The cooling fluid evaporates in the evaporator coil 206 and cools the aqueous buffer liquid 202. The gaseous cooling fluid flows from the evaporator coil 206 to the compressor 150, where it is compressed anew.

The cooling fluid evaporates in the evaporator coil 206 and cools the aqueous buffer liquid 202. The gaseous cooling fluid flows from the evaporator coil 206 to the compressor 150, where it is compressed anew.

Now, the operation of the beverage dispenser 100 according to the present invention is described. In a first mode of operation aqueous liquid is drawn from a source of aqueous liquid 102 and dispensed by the nozzle 132 into the vessel 101 as described above. In the first mode of operation the controller controls the inlet valve 156 arranged downstream of the prefilter 104 and upstream of the evaporator 152 such that aqueous liquid from the source 102 enters an inlet 156a of the inlet valve 156 and exits the inlet valve 156 by the outlet 156c of the inlet valve to the recooling inlet 152a of the evaporator 105. The condensator recools the cooling fluid flowing through the condensator 152 by dissipating the condensing heat to the aqueous liquid flowing through the condensator 152.

In the first operation mode the controller 136 instructs the pump 105 to draw aqueous liquid from the source 102 of aqueous liquid through the prefilter 104, through the inlet valve 156, through the evaporator 152, through the pump 105 into the inlet 106a of the reverse osmosis filter 106 by a first pressure that allows that aqueous liquid passes the membrane 106d of the reverse osmosis filter 106. The filtered permeate passes the membrane 106d and the concentrate exits the reverse osmosis filter by the concentrate outlet 106c into a concentrate conduit 107. Downstream of the concentrate opening 106c of the reverse osmosis filter 106 a reverse osmosis throttle 158 is arranged. The reverse osmosis throttle 158 controls the pressure in the reverse osmosis filter 106 and the portion of aqueous liquid that is passed through the concentrate outlet 106c. In one embodiment the reverse osmosis throttle 158 may have a fixed orifice. In another embodiment the size of the orifice of the concentrate throttle 158 may be controlled by the controller 136. Generally, the reverse osmosis throttle is configured such that approximately 30% of the aqueous liquid is passed to the concentrate outlet 106c, wherein this value is depending on the quality and salinity of the aqueous liquid.

The permeate exits the reverse osmosis filter 106 via the permeate opening 106b and flows through a permeate conduit 108 to the inlet 159a of a permeate valve 159. During dispensing a beverage in the first operation mode the controller 136 switches the permeate valve such that beverage is passed from the first outlet 159b of the permeate valve 159 to a first temperature sensor 160 sensing the temperature of the permeate and to the inlet 162a of a tempering valve 162. The controller 136 switches the tempering valve 162 such that permeate exits the first outlet 162b of the tempering valve 162 and enters the coil shape conduit 204 by the permeate inlet 204a. The permeate is cooled as it flows through the coil shaped conduit 204. The permeate exits the cooling bath 200 by the permeate outlet 204b to a first inlet of a T valve 164. The processor 136 switches the T valve 164 such that the permeate is passed to a second temperature sensor 166. The second temperature sensor 166 senses the temperature of the permeate passing there through and transmits the actual temperature of the permeate to the processor 136. The second temperature sensor may be used to control operation of the flow-type tempering device 122.

Thereby, the permeate flows through the flow-type carbonization device 122, the flow-type tempering device 124 and the flow-type mineralization device 126 to an inlet 130a of the output valve 130. The controller 136 switches the output valve 130 such that the beverage exits the output valve 130 by the first outlet 130b, and the beverage is dispensed by the nozzle 132 into the user vessel 101.

Further, the processor instructs the compressor 150 to compress cooling fluid that is condensed in the condenser 152 and dissipates heat to the permeate flowing through the condenser. Further, the cooling fluid cools the aqueous buffer liquid 202 in the cooling bath 200 by the evaporator coil 206 as described above.

In the first operation mode beverage is dispensed that is generated from the aqueous liquid drawn from the source 102 of aqueous liquid. The permeate and a beverage is in a permanent flow and there is no tank for storing permeate of the beverage that may cause stagnation and germ formation associated with stagnation. The beverage may be prepared individually by recipe is stored in the database 140 and accessed by the controller 136. Further, aqueous liquid is used for recooling the condenser 152. The increased temperature of the aqueous liquid increases the efficiency of the reverse osmosis filter 106. The concentrate is drained by the drain conduit 107. The concentrate has a higher temperature than the aqueous liquid.

Since the operation point of the cooling system according to the present invention is comparably stable a high coefficient of performance may be achieved (coefficient of performance>1). The cooling system of the present invention does not run out equilibrium, since a higher volume of aqueous liquid is available for recooling the condenser 152 as compared with the permeate volume that has to be cooled by the evaporator.

In one embodiment the controller 136 may control the tempering valve 162 and the T valve 164 such that not the entire portion of permeate is passed through the coil shape conduit 204. In this embodiment the controller 136 may control the tempering device 162 and the T valve 164 such, that a portion of the permeate is passed through the coil shape conduit 204 and another portion of permeate is passed through a bypass conduit 166. The controller 136 may switch the tempering valve 162 and the T valve 164 intermittently. Thereby, the temperature of the permeate is only reduced by a smaller temperature such that less electric power is required by the tempering device 122 for heating the permeate to the desired set temperature con be reduced.

In a second operation mode that is applied after switching on the beverage dispenser 100 or after a longer period of inactivity of the beverage dispenser 100 the aqueous buffer liquid 202 is cooled until the temperature of the aqueous buffer liquid ranges within a desired temperature range. The controller instructs the compressor 150 and cooling circuit to operate as described above. The controller 136 instructs the pump 105 to draw aqueous liquid from the source 102 of aqueous liquid and to pressurize the aqueous liquid with a second pressure that is lower than the first pressure, such that the aqueous liquid cannot pass the membrane 106 the of the reverse osmosis filter 106. The processor 136 switches the inlet valve 156 such that the aqueous liquid passes from the first inlet opening 156a of the inlet valve 156 to the outlet 156b of the inlet valve. The aqueous liquid passes through the inlet valve and then through the condenser 152 and cools the cooling fluid. The condensator recools the cooling fluid flowing through the condensator 152 by dissipating the condensing heat to the aqueous liquid flowing through the condensator 152. Thereby, the temperature of the aqueous liquid is increased by the dissipated condensing heat. Since the aqueous liquid does not pass the membrane 106d, the entire portion of the aqueous liquid is discarded via the concentrate opening 106d of the reverse osmosis filter 106.

The beverage dispenser 100 further comprises a drain valve 168 having an inlet 168a arranged downstream of the reverse osmosis throttle 158. During the first operation mode and the second operation mode the controller 136 may switch the drain valve 168 such that the concentrate exits the first outlet 106b of the drain valve 168 and is passed to a sink 172 and is discarded. The controller 136 may switch the drain valve 168 such that the concentrate exits the second outlet 168c of the drain valve 168 and is filled into a drain tank 170. The concentrate from the drain tank may be used at a suitable time for recooling the heat exchanger 152.

In a third operation mode the processor 136 may switch the inlet valve 156 such that liquid from the drain tank 170 can flow via a second inlet 156b of the inlet valve to the outlet port 156c of the inlet valve 156 to the condenser 152. The controller 136 instructs the compressor 150 and the cooling circuit to operate as discussed. The condensator recools the cooling fluid flowing through the condensator 152 by dissipating the condensing heat to the aqueous liquid flowing through the condensator 152. The processor 136 instructs the pump 105 to pressurize the liquid from the concentrate tank 170 with the second pressure such that it cannot not pass the membrane 106d of the reverse osmosis filter and exits by the concentrate opening 106c of the reverse osmosis filter 106. The processor 136 may switch the drain valve 168 such that the liquid is discarded by the sink 172. In one embodiment the processor 136 may switch the drain valve 168 such that the liquid is recycled into the drain tank 170. The third operation mode may be utilized to increase efficiency of use of the aqueous liquid from the source 102 of aqueous liquid during cooling the permeate.

In a fourth operation mode components of the beverage dispenser 100 are flushed. Such flushing may be necessary of the beverage dispenser 100 has not been used for a longer period than a predetermined period. For flushing the processor operates in a fourth operation mode. In the fourth operation mode the controller 136 switches the inlet valve 156 such that aqueous liquid is drawn from the source 102 of aqueous liquid through the first inlet 156a of the inlet valve 156 to the outlet 156c of the inlet valve 156. The aqueous liquid passes the evaporator 152 as described above. The processor 136 instructs the compressor 150 to compress the cooling fluid and the cooling circuit is operated as described above. The processor 136 instructs the pump 105 to pressurize the aqueous liquid such that aqueous liquid entering the inlet 106a of the reverse osmosis filter passes partly the membrane 106d and exits as permeate the permeate opening 106a. The concentrate exits the reverse osmosis filter 106 by the concentrate opening 106b. The condensator recools the cooling fluid flowing through the condensator 152 by dissipating the condensing heat to the aqueous liquid flowing through the condensator 152.

The controller 136 may switch the tempering valve 162 and the T valve such that the coil shape conduit 204 and/or the bypass conduit 166 are flushed. After the T valve 164 the permeate passes the second temperature sensor 166, the flow-type carbonization device 122, the flow-type tempering device 124, and the flow-type mineralization device 126.

The processor switches the output valve 130 such that the permeate may flow from the inlet 130a of the output valve 130 to the second outlet 130c of the output valve 130. The permeate flows from the second outlet 130c of the output valve to the drain tank 170 and may be stored for later recooling.

In a fifth operation mode the controller may switch the permeate valve 159 such that permeate passing the membrane 106 exits the second outlet 159c of the permeate valve 159 into a sink or into the tank. This operation mod may be useful to flush the membrane 106d of the reverse osmosis filter 106 for avoiding migration of solved ions through the membrane 106d.

First of all, the present invention has the advantage that no forced convection of air is necessary for dissipating heat of a cooling device. Thereby, noise of the beverage dispenser is reduced significantly (from an unsatisfying high level to inaudible), installation of the beverage dispenser is facilitated, maintenance efforts of the beverage dispenser can be reduced, no hot air is directed into a room etc.

The second advantage of the present invention is, that the temperature of the aqueous liquid, such as tap water, is increased in the recooling heat exchanger. Tap water may have a temperature between 7° C. and 15° C. depending on the location and the season. If the temperature of the aqueous liquid entering the inlet of the reverse osmosis filter is increased, the efficiency of the reverse osmosis membrane is increased and the membrane may be operated with a lower pressure or the reverse osmosis filter outputs more permeate if a constant pressure is applied.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

It is intended that the claims and claim elements recited below do not invoke 35 U.S.C. § 112(f) unless the words "means for" or "step for" are explicitly used in the particular claim. The above-described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A beverage dispenser, having
a supply opening adapted for supplying an aqueous liquid from a source of aqueous liquid, wherein the supply opening is couplable to the source of aqueous liquid;
a recooling heat exchanger having a heat receiving portion, a recooling inlet and a recooling outlet, wherein the supply opening is coupled with the recooling inlet;
a reverse osmosis filter having an inlet for aqueous liquid, a permeate outlet and a concentrate outlet, wherein the recooling outlet of the recooling heat exchanger is connected to the inlet of the reverse osmosis filter; and
a cooling device having a cooling portion extracting heat energy from the permeate and a heat dissipation portion dissipating energy to a the heat receiving portion of the recooling heat exchanger;
wherein the heat dissipation portion of the cooling device is thermally coupled with the heat receiving portion of the recooling heat exchanger; and
wherein the cooling portion of the cooling device is thermally coupled with the permeate exiting the permeate outlet of the reverse osmosis filter, wherein the permeate enters the cooling portion by a cooling portion permeate inlet and exits the cooling portion by a cooling portion permeate outlet.

2. The beverage dispenser according to claim 1, further comprising at least one beverage preparation component arranged downstream of the cooling portion and upstream of a nozzle for outputting beverage, wherein the beverage preparation component may comprise:
a carbonization device for carbonizing beverage; and
a mineralization device for mineralizing beverage.

3. The beverage dispenser according to claim 1, wherein
the heat receiving portion of the recooling heat exchanger comprises a condensing portion having a condensing portion inlet and a condensing portion outlet, wherein the condensing portion is adapted to condense a cooling fluid entering the condensing portion inlet in an gaseous state and to exit the condensing portion outlet in a liquid state; and
the cooling device comprises an evaporation portion having an evaporation portion inlet and an evaporation portion outlet, wherein the cooling fluid enters the evaporation portion inlet in a liquid state and exits the evaporation portion outlet in a gaseous state;
the evaporation portion outlet is fluidly coupled with the condensing portion inlet; and
condensing portion outlet is fluidly coupled with the evaporation portion inlet.

4. The beverage dispenser according to claim 3, further comprising a compressor coupled between the evaporator portion outlet and the condensator portion inlet, wherein the compressor is adapted to compress the gaseous liquid.

5. The beverage dispenser according to claim 4, further comprising a controller connected with the pump and the compressor, wherein in a first operation mode:
the controller controls the inlet valve such that aqueous liquid may flow from the source of aqueous liquid via the first outlet of the inlet valve to the recooling inlet;
the controller controls the pump to operate with a first pressure such that aqueous liquid passes through the membrane of the reverse osmosis filter to the permeate outlet; and
the controller controls the compressor to pass cooling fluid to the condensing portion inlet of the recooling heat exchanger.

6. The beverage dispenser according to claim 5, wherein in a second operation mode
the controller controls the inlet valve such that aqueous liquid may flow from the source of aqueous liquid via the first outlet of the inlet valve to the recooling inlet;
the controller controls the pump to operate with a second pressure such that aqueous liquid passes not through the membrane of the reverse osmosis filter to the permeate outlet but exits the reverse osmosis filter through the concentrate outlet;
the controller controls the compressor to pass cooling fluid to the condensing portion inlet of the recooling heat exchanger; and
the second pressure is lower than the first pressure.

7. The beverage dispenser according to claim 5, wherein in a third operation mode
the controller controls the inlet valve such that liquid may flow from the outlet of the drain tank via the second outlet of the inlet valve to the recooling inlet;
the controller controls the pump to operate with a second pressure such that concentrate passes not through the membrane of the reverse osmosis filter to the permeate outlet but exits the reverse osmosis filter through the concentrate outlet,
the controller controls the compressor to pass cooling fluid to the condensing portion inlet of the recooling heat exchanger; and
the second pressure is lower than the first pressure.

8. The beverage dispenser according to claim 5, further comprising a tempering valve comprising
an inlet coupled with the permeate outlet of the reverse osmosis filter;
a first outlet coupled with the cooling portion permeate inlet; and
a second outlet coupled with a heating device; and
wherein in a fourth operation mode
the controller controls the tempering valve such that permeate can flow via the second outlet of the tempering valve to the heating device;
the controller controls the pump to operate with a first pressure such that aqueous liquid passes through the membrane to the permeate outlet; and
the controller controls the compressor to pass cooling fluid to the condensing portion inlet of the recooling heat exchanger.

9. The beverage dispenser according to claim 1, further comprising a pump arranged upstream of the inlet of the reverse osmosis filter.

10. The beverage dispenser according to claim 1, further comprising a cooling bath, wherein
the cooling bath comprises a tank, in which an aqueous buffer liquid is stored, wherein the aqueous buffer liquid is thermally coupled with the cooling portion of the cooling device; and
the cooling bath comprises a cooling conduit that is surrounded by the aqueous buffer liquid and wherein the permeate flows within the cooling conduit.

11. The beverage dispenser according to claim 10, wherein the cooling bath comprises a circulation element for providing a forced circulation of the aqueous buffer liquid in the tank.

12. The beverage dispenser according to claim 1, further comprising a drain tank having a first drain tank inlet and a drain tank outlet and an inlet valve having a first inlet, a second inlet and an outlet, wherein
the drain tank inlet is coupled with the concentrate outlet; and the drain tank outlet is coupled with the second inlet of the inlet valve;

the first inlet of the inlet valve is coupled with the supply opening; and the outlet of the inlet valve is coupled with the recooling inlet.

13. The beverage dispenser according to claim 12, further comprising an output valve having an inlet, a first outlet and a second outlet, wherein the inlet of the output valve is in fluid communication with the permeate outlet;

the first outlet of the output valve is in fluid communication with the nozzle outputting beverage into a user vessel; and the second outlet of the output valve is in fluid communication with the drain tank such that liquid can flow from the second outlet of the output valve into the drain tank.

14. The beverage dispenser according to claim 12, further comprising a drain valve having an inlet, a first outlet and a second outlet, wherein inlet of the drain valve is coupled with the concentrate outlet of the reverse osmosis filter;

the first outlet of the drain valve is coupled with the second inlet of the inlet valve; and the second outlet of the drain valve is in fluid communication with the drain tank such that liquid may flow from the second outlet of the drain valve into the drain tank.

15. Method of preparing beverage, comprising the following steps: —drawing an aqueous liquid from a source of aqueous liquid; —passing the aqueous liquid to a recooling inlet of a recooling heat exchanger having a heat receiving portion thermally coupled with the aqueous liquid passing through the recooling heat exchanger, wherein heat is transferred from the heat receiving portion to the aqueous liquid passing through the recooling heat exchanger; —passing the aqueous liquid from an outlet of the recooling heat exchanger to the inlet of a reverse osmosis filter; —passing permeate from a permeate outlet of the reverse osmosis filter to a cooling device having a cooling portion extracting heat energy from the permeate and a heat dissipation portion dissipating energy to the heat receiving portion of the recooling heat exchanger, wherein the cooling portion of the cooling device is thermally coupled with the permeate exiting the permeate outlet of the reverse osmosis filter and wherein the heat dissipation portion of the cooling device is thermally coupled with the heat receiving portion of the recooling heat exchanger.

* * * * *